INVENTOR.
DEAN ARTHUR YOUNG

United States Patent Office 3,360,458
Patented Dec. 26, 1967

3,360,458
HYDROCRACKING PROCESS
Dean Arthur Young, Yorba Linda, Calif., assignor to Union Oil Company of California, Los Angeles, Calif., a corporation of California
Filed Nov. 21, 1966, Ser. No. 595,799
The portion of the term of the patent subsequent to Nov. 22, 1983, has been disclaimed and dedicated to the Public
9 Claims. (Cl. 208—111)

ABSTRACT OF THE DISCLOSURE

Maximum efficiency is obtained in the hydrocracking of feedstocks containing both polycyclic and non-polycyclic hydrocarbons by utilizing both a crystalline zeolite catalyst and an amorphous cogel catalyst, the zeolite catalyst containing a higher proportion of Group VIII noble metal than the amorphous catalyst.

---

Figure 1:
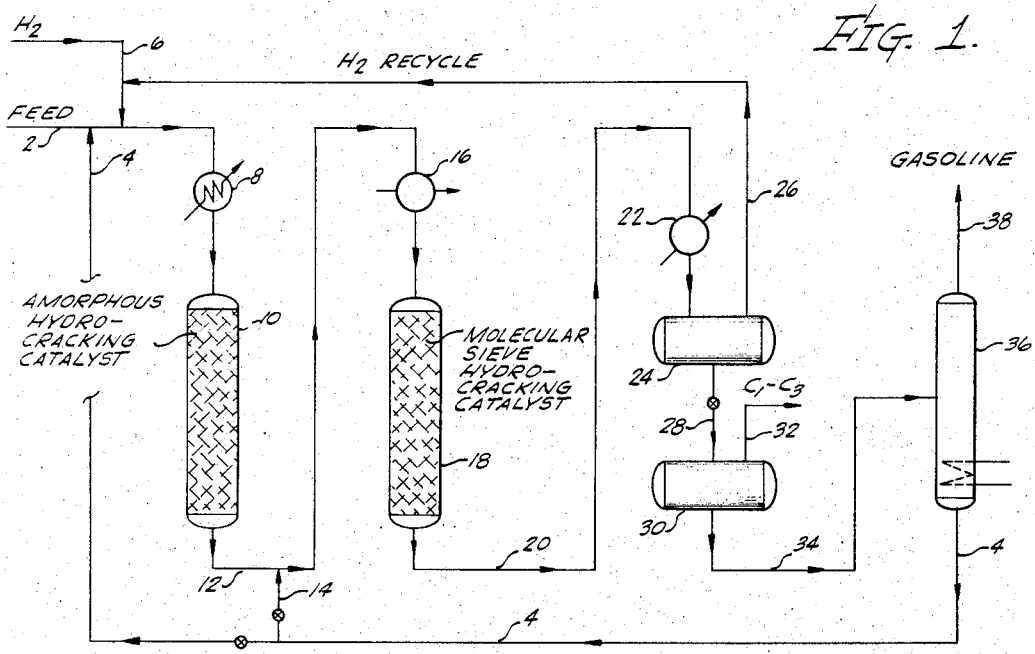

This application is a continuation-in-part of application Ser. No. 496,893, filed Oct. 18, 1965, which in turn is a continuation-in-part of Ser. No. 193,791, filed May 10, 1962, now Patent No. 3,287,252.

This invention relates to catalytic hydrocracking, and more particularly is concerned with the hydrocracking of mineral oil feedstocks containing both polycyclic hydrocarbons and non-polycyclic hydrocarbons of the openchain and/or monocyclic types. The objective is to convert with maximum efficiency both the polycyclic and non-polycyclic moieties of the feed to lower boiling hydrocarbons, boiling for example in the gasoline or jet fuel ranges. More particularly, the process is concerned with the use of a dual catalyst system, one catalyst having maximum activity for hydrocracking polycyclic hydrocarbons, and the other for hydrocracking paraffins and monocyclic hydrocarbons. The mixed feedstock is contacted under hydrocracking conditions with each of the catalysts, either in series or in admixture. One type of catalyst (optimum for hydrocracking paraffins and monocyclic hydrocarbons) comprises a crystalline zeolitic, molecular sieve cracking base upon which is deposited a minor proportion of a Group VI-B and/or Group VIII hydrogenating metal component. The other type of catalyst (optimum for hydrocracking polycyclic hydrocarbons) comprises an amorphous or gel type cracking base such as coprecipitated silica-alumina upon which is deposited, as by impregnation, a small proportion of a Group VI-B and/or Group VIII hydrogenating metal component.

The preferred catalysts are those wherein the hydrogenating component is a Group VIII noble metal, and it is further preferred that the atomic proportion of noble metal be higher in the zeolite catalyst than in the amorphous catalyst. By distributing the hydrogenating component in this manner it is found that the ratio of hydrogenating-to-cracking activity in each catalyst is more nearly optimized so that each may be utilized at maximum efficiency in terms of overall bulk-volume activity.

In one modification of the process, the feedstock is contacted with a mixture of the two types of hydrocracking catalysts, each catalyst being more or less uniformly dispersed throughout the hydrocracking zone. For example, the zeolite catalyst, in powder form, may be admixed with the powdered amorphous catalyst, and the mixture copelleted to form pellets of substantially uniform composition. Alternatively the zeolite catalyst may be separately pelleted, and the pellets may be commingled with the separately pelleted amorphous catalyst. Or if desired, the pelleted zeolite catalyst may be coated with a slurry of the amorphous catalyst, then dried and calcined to produce catalyst pellets comprising a core of zeolite catalyst and an outer rind of amorphous catalyst. In all of these modifications, the gross catalyst distribution does not differ significantly from one sector in the hydrocracking zone to another.

According to the second major modification of the process, separate beds of the two catalysts are employed in series, with the feed passing first through one and then the other. It is preferred in this modification that the feed should first contact the amorphous catalyst and then the zeolite catalyst.

In the first modification, employing the mixed catalysts, it is particularly desirable that the feed be subjected to an initial catalytic hydrofining pretreatment before contacting the mixed catalyst. But it is also contemplated that the feed may be hydrofined before contacting the separate catalyst beds of the second modification.

It is known in the art that optimum hydrocracking conditions may differ considerably for different hydrocarbon types. It has apparently not been appreciated however that different types of catalysts would vary in activity for hydrocracking the different hydrocarbon types. The present invention stems from my basic discoveries that: (1) hydrocracking catalysts based on amorphous cracking bases display maximum efficiency for the conversion of polycyclic hydrocarbons, but are relatively inefficient for converting paraffinic and monocyclic hydrocarbons; (2) a relatively newer class of hydrocracking catalysts, based upon certain crystalline, zeolitic molecular sieve cracking bases, are very efficient for the conversion of paraffinic and monocyclic hydrocarbons, but are relatively inefficient for converting polycyclic hydrocarbons; and (3) the hydrocracking of paraffinic hydrocarbons over either of the above types of catalysts is inhibited to a marked extent by polycyclic aromatic hydrocarbons present in the feed. Hence, in the hydrocracking of mixed feedstocks, it is found that improved results are obtained by contacting the mixed feedstock with both types of catalysts, as compared to contacting the feed with either type of catalyst alone. And, in view of the deleterious effects of polycyclic aromatics upon paraffin hydrocracking, it is found preferable in those cases where separate catalyst beds are employed in series, to locate the amorphous catalyst ahead of the zeolite catalyst so that polycyclic aromatics will be mostly converted to hydrogenated and/or hydrocracked products before the zeolite catalyst is contacted.

In addition to the foregoing basic discoveries, it has now been further discovered in reference to the preferred noble metal catalysts, that to obtain optimum activity for hydrocracking paraffins and monocyclic hydrocarbons with the zeolite catalyst, a higher atomic proportion of noble metal per weight unit of cracking base is required for the zeolite catalyst than is required on the amorphous catalyst to obtain optimum activity for hydrocracking polycyclic hydrocarbons.

Without intending to limit the invention to any theoretical explanation for the above discoveries, it is hypothesized that the differing distribution of active sites on the respective catalysts, and the different hydrocracking mechanisms for aromatic and paraffinic hydrocarbons are the underlying factors. It is generally believed that the hydrocracking of polycyclic aromatic hydrocarbons proceeds first by hydrogenation of an aromatic ring, followed by cracking of the hydrogenated ring. Paraffins on the other hand must be cracked before they can be hydrogenated. Apparently, in the case of molecular sieve type catalysts there is a relatively ineffective distribution of hydrogenation sites at the particular sites upon which aromatic hydrocarbons are preferentially adsorbed. The amorphous or gel type catalysts on the other hand appear to embody a more nearly optimum configuration of hydrogenation sites at the sites of preferential adsorption of aromatics. These differences might also explain the reverse efficiencies for hydrocracking paraffins. Active paraffin cracking sites of the molecular sieve catalysts can operate relatively independently of a conjoint hydrogenation site. Hence, for optimum paraffin hydrocracking, what is required perhaps is a maximum number of acid sites per unit of surface area, the hydrogenation sites being such in number and distribution that the olefinic fragments are hydrogenated rapidly, before significant polymerization can occur. Apparently, the zeolite catalysts display an optimum combination of numberous acid sites, coupled with effective olefin hydrogenation sites, as compared to the amorphous catalysts.

Figure 2:
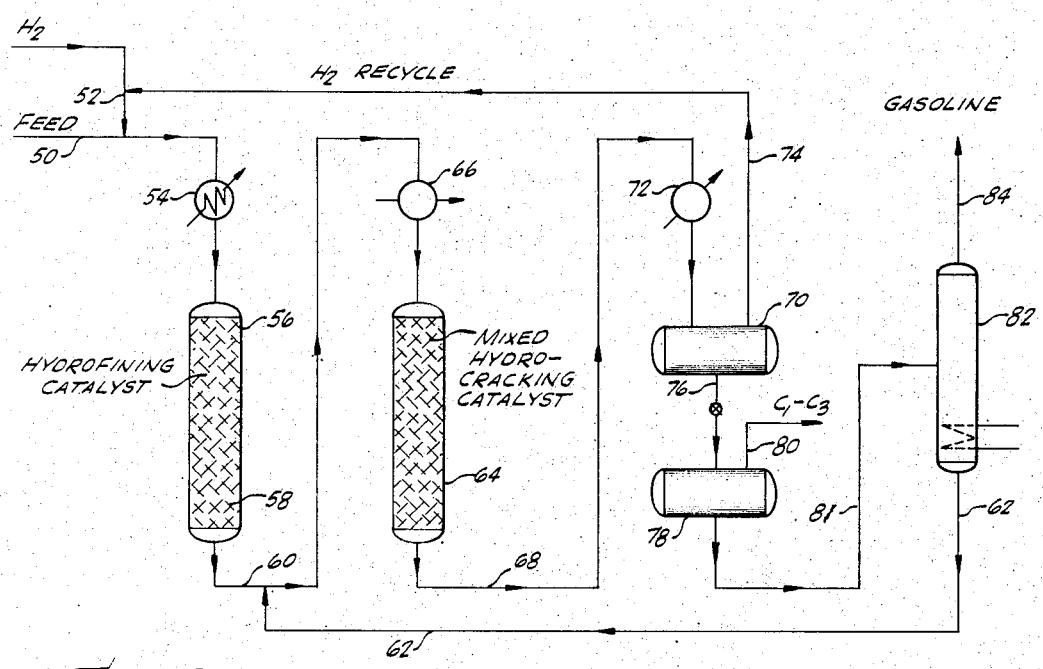

From the foregoing, it will be apparent that the principal object of this invention is to improve overall hydrocracking efficiency of mixed feedstocks by providing separate catalyst components of maximum efficiency for hydrocracking each type of hydrocarbon present in the feed. An overall objective is to reduce the total catalyst inventory required to maintain a given throughput and conversion. Still another object is to increase the selectivity of conversion to products of desired boiling range rather than to light gases such as methane, ethane and the like, and to increase the ratio of isoparaffins to normal paraffins in the product. Another object is to prolong the effective life of hydrocracking catalysts which are adversely affected by polycyclic aromatic hydrocarbons. Other objects will be apparent from the more detailed description which follows:

The invention may perhaps be more readily understood with reference to the accompanying drawing. FIGURE 1 is a flowsheet illustrating the use of separate beds of the two hydrocracking catalysts. FIGURE 2 is a flowsheet illustrating the use of a mixed bed, and also an integral hydrofining pretreatment.

Referring more particularly to FIGURE 1, the initial feedstock, consisting for example of a straight-run gas oil boiling between about 400–800° F., is brought in via line 2, mixed with recycle oil from line 4 (if desired), and with recycle and fresh hydrogen from line 6. The combined mixture is then brought to the desired initial hydrocracking temperature in preheater 8, and passed into first hydrocracking reactor 10, which is filled with a suitable amorphous hydrocracking catalyst to be subsequently described. The feed-hydrogen mixture passes downwardly through hydrocracker 10 in contact with the amorphous catalyst, under conditions within the following general ranges:

AMORPHOUS CATALYST HYDROCRACKING CONDITIONS

| | Operative | Preferred |
| --- | --- | --- |
| Temperature, ° F. | 400–850 | 450–700 |
| Pressure, p.s.i.g. | 400–3,000 | 800–2,000 |
| LHSV, v./v./hr. | 0.5–30 | 1.5–15 |
| $H_2$/oil ratio, s.c.f./b. | 500–20,000 | 2,000–12,000 |

Selection of the specific operating conditions will of course depend upon the specific activity of the catalyst involved, as well as other factors such as refractoriness of the feed, and particularly, nitrogen content of the feed. Higher temperatures will normally be employed for feedstocks containing substantial quantities of nitrogen compounds. It is preferred to adjust the hydrocracking conditions so as to obtain about 10–40 volume-percent conversion per pass to desired product.

The effluent from hydrocracker 10 is withdrawn via line 12, and at this point contains a substantially reduced proportion of polycyclic aromatic hydrocarbons, but still contains substantial amounts of paraffin hydrocarbons boiling above the gasoline range. It is preferred to operate hydrocracker 10 so that the effluent therefrom will contain less than about 2% by volume of polycyclic aromatic hydrocarbons. The presence of monocyclic aromatic hydrocarbons is not detrimental however, since it has been found that they are actually beneficial in the subsequent molecular sieve catalyst conversion zone in that they increase the selectivity of conversion and increase the ratio of isoparaffins to normal paraffins in the final product. If desired, a portion of recycle oil may be mixed with the effluent in line 12 from line 14, the choice depending upon factors to be subsequently considered.

The effluent in line 12 is now transferred via heat exchanger 16 to zeolite hydrocracking reactor 18, in order to effect further paraffin hydrocracking. Heat exchanger 16 may function either as a heater or cooler, depending upon the outlet temperature from reactor 10, and the desired temperature in reactor 18. Since hydrocracking is exothermic, it will normally be desirable to cool the effluent somewhat in exchanger 16. Hydrocracking in reactor 18 may proceed under substantially the same conditions as those in reactor 10. However, due to the reduced proportion of polycyclic aromatics, it is feasible to employ somewhat lower pressures and hydrogen ratios than in reactor 10. Specifically, it is preferred to employ pressures of about 500–2,000 p.s.i.g., and hydrogen rates of about 500–10,000 s.c.f. per barrel of total feed. Also, when the preferred catalysts are employed containing noble metal in the optimum proportions hereinafter described, a substantially higher space velocity may be employed, in the range of about 1.5 to 10 times the space velocity employed in reactor 10. The temperature is suitably adjusted within the ranges previously specified for reactor 10, so as to obtain an additional conversion of about 10–40 volume-percent per pass.

The effluent from hydrocracker 18 is withdrawn via line 20, condensed in cooling unit 22, and passed into high-pressure separator 24, from which recycle hydrogen is withdrawn via line 26, and recycled to line 6 as previously described. The liquid condensate in separator 24 is then flashed via line 28 into low-pressure separator 30, from which light hydrocarbon gases are exhausted via line 32. The low-pressure condensate in separator 30 is then transferred via line 34 to fractionating column 36, from which desired products such as gasoline are recovered overhead via line 38. The unconverted oil boiling above the desired product range is withdrawn as bottoms via line 4, and may be utilized in other products such as jet fuels, diesel fuels, or the like. Alternatively, it may be recycled via line 4 as illustrated. Normally, the unconverted oil is too rich in polycyclic aromatics to be recycled directly to reactor 18, and if it contains more than about 2% of such polycyclics, it is preferable to recycle all of it to line 2 as previously described. Alternatively, where the polycyclic content is less than about 2%, all or a portion thereof may be diverted via line 14 to line 12 for direct recycle to hydrocracker 18.

Referring now to FIGURE 2, the initial feedstock is brought in via line 50, mixed with recycle and fresh hydrogen from line 52, preheated to incipient hydrofining temperature in heater 54, and then passed directly into hydrofiner 56, containing a bed of hydrofining catalyst 58, where hydrofining proceeds under substantially conventional conditions. Suitable hydrofining catalysts include for example mixtures of the oxides and/or sulfides of cobalt and molybdenum, or of nickel and tungsten, preferably supported on a carrier such as alumina, or alumina containing a small amount of coprecipitated silica gel. Other suitable catalysts include in general the oxides and/or sulfides of the Group VI–B and/or Group VIII metals, preferably supported on substantially non-cracking adsorbent oxide carriers such as alumina, silica, titania, and the like. The hydrofining operation may be conducted either adiabatically or isothermally, and under the following general conditions:

HYDROFINING CONDITIONS

|  | Operative | Preferred |
| --- | --- | --- |
| Temperature, °F | 600–850 | 650–825 |
| Pressure, p.s.i.g | 300–3,000 | 800–2,000 |
| LHSV, v./v./hr | 0.5–10 | 1–5 |
| $H_2$/oil ratio, s.c.f./b | 500–15,000 | 1,000–10,000 |

The above conditions are suitably adjusted so as to reduce the organic nitrogen content of the feed to below about 100 parts per million, and preferably below about 50 parts.

The effluent from hydrofiner 56 is withdrawn via line 60, blended (if desired) with recycle oil from line 62, and passed into hydrocracker 64 via heat exchanger 66. Heat exchanger 66 serves to heat or cool the effluent in line 60 to the desired incipient hydrocracking temperature. Hydrocracking in reactor 64 proceeds under conditions within the same general ranges as those previously described for hydrocracker 10 of FIGURE 1, except that the space velocity will be approximately the combined space velocities of reactors 19 and 18. Specifically, space velocities between about 1 and 5 are preferred. If desired, cool hydrogen may be injected at one or more points in the catalyst bed to maintain a more nearly isothermal temperature profile. The catalyst in hydrocracker 64 is a mixture of the two types to be subsequently described, amorphous and crystalline. It may be in the form of copelleted powders, or separate pellets of the two types. Normally, about 40–80 volume-percent conversion to desired products is obtained in reactor 64 by suitably adjusting the process conditions, principally temperature.

The effluent from hydrocracker 64 is withdrawn via line 68 and transferred to high-pressure separator 70 via condenser 72. Recycle hydrogen is withdrawn from separator 70 via line 74, and recycled to line 52 as previously described and the high-pressure condensate in separator 70 is flashed via line 76 into low-pressure separator 78, from which light gases are withdrawn via line 80. The low-pressure condensate in separator 78 is then transferred via line 81 to fractional distillation column 82, from which desired products such as gasoline are taken overhead via line 84, while unconverted oil is withdrawn as bottoms via line 62. The bottoms fraction may either be diverted to jet fuel and/or diesel products, or recycled to line 60 as previously described.

The initial feedstocks which may be treated herein include in general any mineral oil fraction having an initial boiling point above the conventional gasoline range, i.e., above about 400° F., and having an end-boiling-point of up to about 1,000° F. This includes straight-run gas oils, coker distillate gas oils, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 900° F., having an API gravity of 15–40°, and containing at least about 10% by volume of aromatic components. Such oils may also contain from about 0.1% to 5% of sulfur and from about 0.01% to 2% by weight of nitrogen.

The amorphous catalysts used herein may comprise any desired combination of an amorphous cracking base with a Group VI–B and/or Group VIII metal hydrogenating component. Suitable cracking bases include for example alumina gel, silica gel, acid treated clays and the like. The more active bases comprise coprecipitated mixtures of two or more difficulty reducible oxides such as silica-alumina, silica-magnesia, silica-zirconia, alumina-boria, silica-titania, silica-zirconia-titania, and the like. Acidic metal phosphates such as aluminum phosphate may also be used. The preferred cracking bases comprise coprecipitated composite gels of silica and alumina containing about 3–90% silica, coprecipitated composites of silica, titania and zirconia containing about 5–75% of each component, coprecipitated composites of silica and magnesia, or of silica and zirconia, and the like. Any of these cracking bases may be further promoted by the addition of a halide such as HF, $BF_3$, $SiF_4$ and the like.

The term "amorphous" as used herein is intended to designate a solid state wherein crystallinity is not discernible in the powdered material by X-ray diffraction analysis. This does not preclude the presence of microcrystalline micelles, such as may be present in many gel structures. The zeolite structures, on the other hand, display definite crystallinity which is readily detectable by X-ray diffraction analysis.

The hydrogenating metal is normally added to the amorphous cracking base by aqueous impregnation in amounts of about 0.01 to 25% by weight, based on free metal. (The term "hydrogenating component" as used herein, is intended to include the free metals and compounds thereof, e.g., the oxides or sulfides.) The preferred hydrogenating metals are the Group VIII noble metals, and especially platinum, palladium, rhodium and iridium. Nickel, iron, cobalt, chromium, molybdenum and tungsten may be used to less advantage. The finished catalysts are preferably employed in the form of ⅛ to ¼-inch pellets or granules.

In respect to the preferred noble metal-amorphous catalysts, the noble metal content may range between about 0.01% to 2% by weight. However, an important economic aspect of the invention resides in using amorphous catalysts containing certain minimal proportions of noble metals. It has been found that the conventional larger proportions, e.g., 0.5–2%, tend to reduce the cracking activity of the catalysts, and that the smaller proportions give substantially equivalent hydrogenation activity for heavy aromatic hydrocarbons. Moreover, and even more surprisingly, the catalysts containing the smaller proportions of noble metal are found to deactivate at a lower rate than those containing the larger amounts. The optimum proportions range between about 0.001 and 0.05, preferably between about 0.005 and 0.02, gram atoms of metal per kilogram of finished catalyst. These optimum proportions are as follows in terms of weight-percent:

|  | Broad Range | Preferred Range |
| --- | --- | --- |
| Palladium, Wt. percent | 0.0107–0.537 | 0.0537–0.215 |
| Platinum, Wt. percent | 0.0195–0.976 | 0.0976–0.390 |
| Rhodium, Wt. percent | 0.0103–0.515 | 0.0515–0.206 |
| Iridium, Wt. percent | 0.0192–0.961 | 0.0961–0.384 |

The zeolite cracking bases for use herein are partially dehydrated, crystalline molecular sieves, e.g., of the "X" or "Y" crystal types, said molecular sieves having relatively uniform pore diameters of about 6 to 14 A., and comprising silica, alumina, and one or more exchangeable zeolitic cations.

A particularly active and useful class of molecular sieve cracking bases are those having a relatively high $SiO_2/Al_2O_3$ ratio, between about 3.0 and 10.0. The most active forms are those wherein the exchangeable zeolitic cations are hydrogen and/or a polyvalent metal such as magnesium, calcium, zinc, the rare earth metals, and the like. In particular, the "Y" molecular sieves, wherein the $SiO_2/Al_2O_3$ ratio is between about 4 and 5 are preferred, either in their hydrogen form, or a polyvalent metal form. Normally, such molecular sieves are prepared first in the sodium form, and the sodium is ion-exchanged out with a polyvalent metal, or where the hydrogen form is desired, with an ammonium salt followed by heating to decompose the zeolitic ammonium ion and leave a hydrogen ion. It is not necessary to exchange out all of the sodium; the final compositions may contain up to about 6% by weight of $Na_2O$, or equivalent amounts of other monovalent metals. Molecular sieves of this nature are described more particularly in U.S. Patent No. 3,130,006.

In the zeolite catalysts, it is desirable to deposit the hydrogenating metal thereon by ion exchange. This can be accomplished by digesting the zeolite, preferably in its ammonium form, with an aqueous solution of a suitable compound of the desired metal, wherein the metal is present in a cationic form, and then reducing to form the free metal, as described for example in U.S. Patent No. 3,236,762.

The proportion of hydrogenating metal on the zeolite catalyst may range between about 0.1–25% by weight, and may be the same or different than the metal employed on the amorphous catalyst. In the case of the Group VIII noble metals, preferred amounts range between about 0.05 and 0.25 gram atom per kilogram of finished catalyst, or in terms of weight-percent:

Palladium, wt.-percent _____ 0.537–2.685
Platinum, wt.-percent _____ 0.976–4.880
Rhodium, wt.-percent _____ 0.515–2.575
Iridium, wt.-percent _____ 0.961–4.805

It is specifically preferred that the noble metal content of the zeolite catalyst be at least about 1.5, and preferably at least 2.0 times the noble metal content of the amorphous catalyst, in terms of atomic concentration. This high optimum proportion is critical to the conjoint use of the amorphous catalyst; proportions above about 0.05 gram atoms per kilogram are largely wasted if the zeolite catalyst must also perform the function herein of the amorphous catalyst, namely the hydrocracking of polycyclic hydrocarbons.

The relative proportions of the finished amorphous and zeolite catalysts to be employed, whether in a mixed bed as in FIGURE 2, or in separate beds as in FIGURE 1, depends to some extent on the ratio or aromatic and paraffin hydrocarbons present in the feed. Highly aromatic feedstocks will require relatively more of the amorphous catalyst, while highly paraffinic feeds will require more of the zeolite catalyst. Normally, for feedstocks containing about 20–50% by volume of aromatics, it is preferred that about 40–75% of the total catalyst volume be of the amorphous type. In any case, it is preferred to use sufficient of the amorphous catalyst to reduce the content of polycyclic aromatic hydrocarbons to below about 2% by volume of the final hydrocarbon effluent.

In the preferred modification using optimum proportions of noble metal on the two catalysts, it is generally feasible (and highly desirable from an economic standpoint) to use relatively small proportions of the zeolite catalyst, between about 15% and 40% of the total volume. This factor usually more than compensates for the cost of the increased noble metal concentration on the zeolite catalyst.

The following examples are cited to demonstrate the critical features of the above-described process, but are not intended to be limiting in scope:

Example I

In this example tetralin, a typical aromatic hydrocarbon found in gas oils, was subjected to hydrocracking over two molecular sieve catalysts and over two amorphous catalysts in order to determine the relative efficiency of such catalysts for hydrocracking aromatic hydrocarbons. All the tests were carried out at 1,000 p.s.i.g., 8 liquid hourly space velocity, and using 20,000 s.c.f. of hydrogen per barrel of feed. The relative conversions were measured in terms of product gravities, an increase in gravity over that of the feed indicating hydrogenation and/or hydrocracking. In all cases where the product gravity is above 25.6° API, there was necessarily some substantial hydrocracking, because simple hydrogeneation of tetralin results mainly in cis-decalin which has a gravity of 25.6° API. The catalysts tested were as follows:

*Catalyst No. 1.*—A crystalline, zeolitic Y molecular sieve in its hydrogen form (decationized), and loaded by ion-exchange with 0.5% by weight of palladium.

*Catalyst No. 2.*—A crystalline, zeolitic Y molecular sieve in its magnesium form, containing about 3% by weight of magnesium and 0.5% by weight of palladium added by ion-exchange.

*Catalyst No. 3.*—A synthetic, coprecipitated amorphous silica-alumina cracking catalyst containing about 87% silica and 13% alumina, and containing 0.4% palladium added by impregnation with palladium chloride solution.

*Catalyst No. 4.*—A synthetic, coprecipitated silica-alumina cracking catalyst, as in catalyst No. 3, containing 0.5% of palladium incorporated therein by ion-exchange with an aqueous solution of a tetramine palladium complex.

The results of the several tests were as follows:

TABLE 1.—HYDROCRACKING OF TETRALIN

| | Catalyst No. | | | | | | | |
|---|---|---|---|---|---|---|---|---|
| | 1 | | 2 | | 3 | | 4 | |
| | Composition | | | | | | | |
| | Crystalline H–"Y" sieve plus 0.5% Pd | | Crystalline Mg–"Y" sieve plus 0.5% Pd | | Amorphous SiO$_2$–Al$_2$O$_3$ plus 0.4% Pd | | Amorphous SiO$_2$–Al$_2$O$_3$ plus 0.5% Pd | |
| Gravity of feed ° API | 14.4 | | 14.4 | | 14.4 | | 14.4 | |
| Hours on stream | 1 | 17 | 1 | 7 | 2 | 20 | 1 | 23 |
| Temp., °F | 600 | 600 | 650 | 670 | 611 | 611 | 612 | 612 |
| Product Gravity, °API | 38.9 | 24.2 | 29 | 15.4 | 31.2 | 30.9 | 30 | 31.1 |

It will be noted that the initial high activity of catalysts 1 and 2 declined rapidly, so that after a few hours substantially no hydrocracking was taking place. In contrast, catalysts 3 and 4 did not diminish in hydrocracking activity over a period of at least 20 hours. It is thus clear that the amorphous catalysts display a much higher sustained activity for hydrocracking aromatic hydrocarbons than do the crystalline catalysts 1 and 2.

Example II

Catalysts 1 and 4 of Example I were compared in activity for the hydrocracking of a typical gas oil paraffin, namely n-dodecane. The hydrocracking conditions were the same as in Example I, and product gravities likewise indicate hydrocracking activity, except that in this case it should be noted that any increase in product gravity over the feed gravity necessarily indicates hydrocracking, since further saturation without cracking is not possible. The results of the test were as follows:

TABLE 2.—HYDROCRACKING OF n DODECANE

| Catalyst No. | | | |
|---|---|---|---|
| 1 | | 4 | |
| Composition | | | |
| Crystalline H-"Y" sieve plus 0.5% Pd | | Amorphous SiO$_2$-Al$_2$O$_3$ plus 0.5% Pd | |
| Gravity of feed, ° API | | | |
| 56.4 | | 56.4 | |
| Temp., ° F. | Product Gravity, °API | Temp., ° F. | Product Gravity, °API |
| 550 | 60 | 606 | 57.0 |
| 598 | 70.2 | 604 | 57.1 |
| 500 | 71 | 658 | 58.4 |
| 651 | 86.8 | 655 | 59.0 |
| 651 | 88.4 | 656 | 59.8 |
| 650 | 87.8 | 655 | 59.0 |
| 649 | 87.7 | | |

The much higher initial and sustained activity of the molecular sieve catalyst for hydrocracking paraffins is clearly apparent.

*Example III*

This example demonstrates the deleterious effects of polycyclic aromatics upon paraffin hydrocracking. A molecular sieve hydrocracking catalyst, essentially identical to catalyst No. 1 of Example I, was first used to hydrocrack n-dodecane, then a mixture of n-dodecane and naphthalene, and finally the pure n-docecane, the run being continuous. Hydrocracking conditions were the same as in Example I. The results were as follows:

TABLE 3.—HYDROCRACKING OF n-DODECANE-NAPHTHALENE MIXTURE AT 600° F.

| Naphthalene Content of feed | Feed Gravity, °API | Hours on Stream | Product characteristics | |
|---|---|---|---|---|
| | | | Gravity, ° API | Vol. Percent C$_3$-C$_9$ |
| None | 56.4 | 11 | 69.3 | |
| Do | 56.4 | 14 | 70.3 | |
| Do | 56.4 | 17 | 70.3 | 53.4 |
| 5 Volume Percent | 53.9 | 19 | 67.4 | |
| Do | 53.9 | 23 | 63.1 | |
| Do | 53.9 | 29 | 61.6 | 47.9 |
| Do | 53.9 | 36 | 59.7 | 17.1 |
| None | 56.4 | 38 | 63.1 | |
| Do | 56.4 | 41 | 64.1 | 29.2 |

The foregoing results clearly show that, upon adding 5% naphthalene to the feed, the conversion dropped rapidly. They also show that the catalyst was not permanently deactivated, for upon eliminating naphthalene from the feed, the conversion began to increase. This deactivating effect is not observed however when monocyclic aromatics are added to the feed.

*Example IV*

To compare the results obtainable by the use of a dual-catalyst bed vs. each single catalyst, a mixed feedstock (21.6° API gravity) containing 21.5 wt. percent n-dodecane, 21.5% naphthalene and 57% Tetralin (these materials being typical gas oil hydrocarbons) was subjected to hydrocracking at 1,000 p.s.i.g., 8.0 LHSV and using 20,000 s.c.f. of hydrogen per barrel of feed, in the following series of runs:

*Run A.*—The feed was passed over a unitary bed of amorphous SiO$_2$-Al$_2$O$_3$ cogel (87/13 weight-ratio) granules upon which was deposited (by ion-exchange) 0.5% by weight of palladium.

*Run B.*—The feed was passed over a unitary bed of granular molecular sives of the Y crystal type in their "decationized" or hydrogen form, upon which was deposited by ion-exchange 0.5% by weight of palladium.

*Run C.*—The feed was passed first over a bed of the amorphous catalyst used in Run A, and then over an equal-volume bed of the zeoline catlyst used in Run B, the combined volume of the two beds being the same as used in each of the Runs A and B.

*Run D.*—A continuation of Run C with an enlarged upper bed of amorphous catalyst, so as to give a lower space velocity over the amorphous catalyst.

The results of the various runs were as follows:

TABLE 4

| | Run | | | |
|---|---|---|---|---|
| | A | B | C | D |
| First Catalyst Bed | Amorphous | Zeolite | Amorphous | Amorphous |
| LHSV | 16 | 16 | 16 | 13.3 |
| Second Catalyst Bed | Amorphous | Zeolite | Zeolite | Zeolite |
| LHSV | 16.0 | 16.0 | 16.0 | 16.0 |
| Hrs. on stream | 17 | 11 | 21 | 24 |
| Temp., ° F | 603 | 600 | 607 | 590 |
| Product Gravity, ° API | 36.9 | 27.4 | 37.2 | 40.6 |
| Product Composition, Volume-Percent: | | | | |
| C$_4$-C$_6$ Paraffins | 0.26 | 0.06 | 0.69 | 2.84 |
| C$_5$-C$_6$ Naphthenes | 7 | 4 | 9 | 16 |
| Decalin | 75 | 22 | 71 | 66 |
| Tetralin | 0.4 | 50.6 | 1.7 | 0.3 |
| Naphthalene | <0.1 | 0.3 | <0.1 | <0.1 |
| Iso/Normal Paraffin Ratios: | | | | |
| Butanes | 3 | 3 | 7 | 7 |
| Pentanes | 2 | | 5 | 8 |

The most important point to note from the above is that in Runs C and D, there was a much greater conversion to C$_4$-C$_6$ paraffins and C$_5$-C$_6$ naphthenes than was obtained in Runs A and B. In Run A, the conversion to lower paraffins and naphthenes was low due to the inherently lower activity of the amorphous catalyst for hydrocracking paraffins, even though the conversion of naphthalene and Tetralin was substantially complete. In Run B, the low conversion to paraffins and naphthenes was due to the presence of unconverted Tetralin and naphthalene which strongly inhibited the inherently high paraffin hydrocracking activity of the crystalline catalyst. In Run C, most of the Tetralin and naphthalene was hydrogenated in the amorphous catalyst bed before the feed reached the crystalline catalyst, and hence the paraffin hydrocracking activity of the crystalline catalyst became more effective. However, in Run C there was insufficient conversion of Tetralin and naphthalene in the amorphous bed to allow the crystalline catalyst to function with maximum efficiency, as is shown in Run D wherein the space velocity over the amorphous catalyst was slightly reduced in order to permit a greater degree of preconversion of Tetralin and naphthalene. The effect is demonstrated in the much higher resulting conversion to lower paraffins and naphthenes.

Finally, it will be noted that in Runs C and D, the iso/normal paraffin ratios were much higher than in Runs A and B, which is a decided advantage from the standpoint of gasoline quality.

Example V

This example shows that high-boiling polynaphthenes have an effect similar to naphthalene in deactivating zeolite catalysts, and that the amorphous catalysts are more efficient for hydrocracking high-boiling, non-aromatic polycyclic naphthenic oils.

Four catalysts substantially indentical to those employed in Example I were utilized for hydrocracking a non-aromatic mineral oil ("Kaydol") boiling between about 610° and 960° F., and containing by volume 14% paraffins, 38% mononaphthenes and 48% polynaphthenes. Hydrocracking conditions were the same as in Example I. The results were as follows:

that the respective bottoms fractions from catalysts 1 and 2 had a much lower gravity than the similar fractions from catalysts 3 and 4. It is apparent that the amorphous catalysts are much more active for hydrogenating and cracking heavy polycyclic naphthenes than the crystalline catalysts. It is apparent also however, that the crystalline catalysts were more active than the amorphous catalysts for converting light gas oil naphthenes in the 360–500° F. boiling range.

Example VI

This example demonstrates that, for purposes of hydrocracking paraffins with the zeolite catalysts, higher concentrations of noble metal are desirable than the 0.5% employed in the preceding examples, but that such increased noble metal content is of little or no benefit for hydrocracking polycyclic hydrocarbons.

Two catalysts were employed, one essentially identical to the zeolite catalyst No. 1 for Example I, the other being the same catalyst to which an additional 0.5% of palladium was added. Each catalyst was employed separately for hydrocracking n-dodecane and Tetralin

TABLE 5.—HYDROCRACKING OF NAPHTHENIC MINERAL OIL

| | Catalyst No. | | | | | | | |
|---|---|---|---|---|---|---|---|---|
| | 1 | | 2 | | 3 | | 4 | |
| | Composition | | | | | | | |
| | Crystalline H–"Y" sieve +0.5% Pd | | Crystalline Mg–"Y" sieve +0.5% Pd | | Amorphous SiO$_2$–Al$_2$O$_3$ +0.4% Pd | | Amorphous SiO$_2$–Al$_2$O$_3$ +0.5% Pd | |
| Gravity of Feed, °API | 28.4 | | 28.4 | | 28.4 | | 28.4 | |
| Hrs. on Stream | 23 | 26 | 23 | 26 | 23 | 26 | 23 | 26 |
| Temp. °F.[1] | 699 | 699 | 702 | 701 | 699 | 704 | 700 | 700 |
| Product Gravity, °API | 44.0 | 41.7 | 61.1 | 57.1 | 68.1 | 60.5 | 65.1 | 64.1 |

[1] Temperatures lower than those indicated were maintained during the initial 15–20 hours of the respective runs.

The rate of decline in product gravity over the four-hour runs indicates that the crystalline zeolite catalysts 1 and 2 were being deactivated at a rate about 2 to 4 times that of the amorphous catalysts 3 and 4. Also it was noted that the products from catalysts 1 and 2 had a light green color, indicating the presence of polycyclic aromatics, while the products from catalysts 3 and 4 were water-white.

Distillation of the respective products gave the following fractions:

TABLE 6

| Catalyst No | 1 | 2 | 3 | 4 |
|---|---|---|---|---|
| Boiling Range of Product Fractions: | | | | |
| 0–120° F., Vol. Percent of Feed | 7.6 | 24.0 | 19.1 | 20.9 |
| 120–360° F.: | | | | |
| Gasoline, Vol. Percent of Feed | 28.9 | 38.9 | 55.9 | 61.8 |
| °API | 60.6 | 61.1 | 59.6 | 60.3 |
| 360–500° F.: | | | | |
| Lt. Gas Oil, Vol. Percent of Feed | 5.2 | 4.6 | 16.5 | 10.7 |
| °API | 38.4 | 40.8 | 42.9 | 45.0 |
| 500° F.: | | | | |
| Plus Bottoms, Vol. Percent of Feed | 50.5 | 21.0 | 9.5 | 7.0 |
| °API | 28.3 | 28.9 | 38.1 | 41.0 |

The important points to note above are that crystalline catalysts 1 and 2 were much less active for converting the heavy naphthenic hydrocarbons boiling above 500° F. than were the amorphous catalysts 3 and 4, and further under the conditions of Example I. Results of the two runs employing n-dodecane feed were as follows:

TABLE 7

| Run | | | | | |
|---|---|---|---|---|---|
| E | | | F | | |
| Feed | | | | | |
| n-Dodecane | | | n-Dodecane | | |
| Catalyst | | | | | |
| H–Y Zeolite 0.5% Pd | | | H–Y Zeolite 1.0% Pd | | |
| Hrs. on Stream | Temp., °F. | Product Gravity, °API | Hrs. on Stream | Temp., °F. | Product Gravity, °API |
| 1 | 551 | 47.3 | 1 | 551 | 61.2 |
| 2 | 552 | 57.7 | 2 | 550 | 61.3 |
| 3 | 552 | 57.8 | | | |
| 4 | 602 | 69.3 | 3 | 599 | 77.7 |
| 5 | 602 | 73.4 | 4 | 600 | 82.6 |
| 6 | 602 | 73.0 | 5 | 600 | 82.8 |
| 7 | 602 | 72.8 | | | |
| 8 | 601 | 73.2 | 6 | 651 | 88.7 |
| 9 | 655 | 83.5 | 7 | 650 | 90.3 |
| 10 | 655 | 85.0 | | | |

The differences in product gravity at comparable on-stream times and temperatures between Runs E and F indicate that the catalytic activity was about doubled by increasing the palladium content from 0.5% to 1%. In contrast, the results of the two runs employing Tetralin were as follows:

TABLE 8

| Run | | | | | |
|---|---|---|---|---|---|
| G | | | H | | |
| Feed | | | | | |
| Tetralin | | | Tetralin | | |
| Catalyst | | | | | |
| H-Y Zeolite 0.5% Pd | | | H-Y Zeolite 1.0% Pd | | |
| Hrs. on Stream | Temp., °F. | Product Gravity, °API | Hrs. on Stream | Temp., °F. | Product Gravity, °API |
| 1 | 560 | 31.7 | 1 | 559 | 33.2 |
| 2 | 558 | 32.0 | 2 | 558 | 33.4 |
| 3 | 558 | 29.3 | 3 | 556 | 32.8 |
| 11 | 600 | 19.7 | 11 | 601 | 27.3 |
| 19 | 600 | 16.8 | 19 | 600 | 21.1 |
| 20 | 650 | 17.6 | 20 | 650 | 22.4 |
| 21 | 650 | 17.8 | 21 | 653 | 21.8 |
| 22 | 698 | 19.3 | | | |
| 23 | 699 | 19.3 | 23 | 697 | 22.4 |
| 24 | 699 | 18.9 | 24 | 697 | 22.4 |
| | | | 25 | 698 | 21.7 |

A comparison of the above product gravities shows that only a slight improvement in activity for hydrocracking tetralin was obtainable by increasing the palladium content of the catalyst to 1%, and more importantly that the activity declined substantially as rapidly as the 0.5% Pd catalyst. The rate of decline in 25 hours clearly indicates that after about 2–3 days on stream, there would be substantially no difference in activity between the two catalysts.

*Example VII*

This example demonstrates that, for purposes of hydrocracking a feed containing heavy polycyclic aromatics over the amorphous catalysts, lower concentrations of noble metal are more effective than the 0.4–0.5% proportions employed in Example I.

Four different catalysts were prepared by ion-exchanging 10–20 mesh granules of an 87% silica–13% alumina cogel cracking base with varying amounts of an aqueous solution of tetramine palladium nitrate, followed by drying and calcining in oxygen at 900° F. The resulting catalysts were then tested for the hydrocracking of a heavy gas oil feed (38.5° API; 414–853° F. boiling range) containing 50 p.p.m. sulfur, less than 1 p.p.m. nitrogen, and about 18% aromatics (including 0.8% of polycyclics containing five condensed benzene rings). The test conditions were: temperature, 600–602° F.; pressure, 1,000 p.s.i.g.; LHSV, 2; hydrogen/oil ratio, 12,000 s.c.f./b. The results were as follows:

It is readily apparent that the catalyst containing 0.13% Pd was not only more active for hydrocracking than the catalysts of higher Pd content, but that it had a much lower deactivation rate. The lower deactivation rate is attributed to higher cracking activity for the hydrogenated heavy polycyclic aromatics. These hydrogenated polycyclics, if not destroyed, can undergo dehydrogenation and condensation to form coke deposits. All of the catalysts had approximately the same hydrogenation activity, as indicated by the almost completely saturated products obtained in all runs, but apparently the higher Pd contents tend to destroy cracking activity.

Results analogous to those indicated in the foregoing examples are obtained when other catalysts and conditions, other feedstocks and other process conditions within the broad purview of the above disclosure are employed. It is hence not intended to limit the invention to the details of the examples, but only broadly as defined in the following claims.

I claim:

1. A process for hydrocracking a hydrocarbon feedstock containing both polycyclic and non-polycyclic hydrocarbons, which comprises: subjecting said feedstock plus at least about 500 s.c.f./b. of added hydrogen to catalytic hydrocracking at pressures above about 400 p.s.i.g. in contact with a homogeneously copelleted mixture of two different catalysts A and B, catalyst A consisting essentially of an amorphous solid cracking base upon which is deposited a minor proportion of a Group VIII noble metal, catalyst B consisting essentially of a crystalline, zeolitic, molecular sieve cracking base upon which is deposited a minor proportion of a Group VIII noble metal, catalyst B containing a substantially higher atomic proportion of noble metal than catalyst A, and recovering desired low-boiling hydrocarbons from said hydrocracking.

2. A process as defined in claim 1 where said molecular sieve cracking base is of the Y crystal type.

3. A process as defined in claim 1 wherein said amorphous solid cracking base is a composite of silica gel coprecipitated with at least one other gel from the class consisting of alumina, zirconia, titania and magnesia.

4. A process as defined in claim 1 wherein said feedstock is a mineral oil fraction boiling above the gasoline range, and wherein said desired low boiling hydrocarbons recovered as product comprise gasoline.

5. A process as defined in claim 1 wherein the liquid hourly space velocity with respect to said catalyst B is substantially higher than the liquid hourly space velocity with respect to catalyst A.

6. A process for hydrocracking a hydrocarbon feedstock containing both polycylic and non-polycyclic hydrocarbons, which comprises: subjecting said feedstock plus at least about 500 s.c.f./b. of added hydrogen to catalytic hydrocracking at pressures above about 400 p.s.i.g. in contact with a homogeneously copelleted mixture of two distinct catalysts, A and B, catalyst A consisting essentially of an amorphous solid cracking base upon which is deposited between about 0.001 and 0.05 gram atoms per kilogram of a Group VIII noble metal, catalyst B consisting essen-

TABLE 9

| Run | Pd Content of Catalyst, Wt.-Percent | Hours on Stream | Vol.-Percent Conversion to 350° F. End Point Products | Liquid Product Composition, Vol.-Percent | | |
|---|---|---|---|---|---|---|
| | | | | °API | Aromatics | Saturates |
| J | 0.13 | 0–16 | 35.5 | 50.1 | 2 | 98 |
| | | 16–40 | 13.6 | 44.7 | 3 | 97 |
| K | 0.25 | 0–16 | 27.0 | 49.4 | 2 | 98 |
| | | 16–40 | 5.4 | 44.9 | 3 | 97 |
| L | 0.51 | 0–16 | 24.5 | 49.6 | 2 | 98 |
| | | 16–40 | 3.9 | 44.8 | 3 | 97 |
| M | 0.83 | 0–16 | 28.7 | 49.4 | 2 | 98 |
| | | 16–40 | 4.0 | 44.6 | 2 | 98 | tially of a crystalline, zeolitic molecular sieve cracking base upon which is deposited between about 0.05 and 0.25 gram atom per kilogram of a Group VIII noble metal, catalyst B containing a substantially higher atomic proportion of noble metal than catalyst A, and recovering desired low-boiling hydrocarbons from said contacting.

7. A process as defined in claim 6 wherein said molecular sieve cracking base is of the Y crystal type.

8. A process as defined in claim 6 wherein said amorphous solid cracking base is a composite of silica gel co-precipitated with at least one other gel from the class consisting of alumina, zirconia, titania and magnesia.

9. A process as defined in claim 6 wherein the liquid hourly space velocity with respect to said catalyst B is substantially higher than the liquid hourly space velocity with respect to catalyst A.

References Cited
UNITED STATES PATENTS

| | | | |
|---|---|---|---|
| 2,945,805 | 7/1960 | Ciapetta et al. | 208—111 |
| 3,236,761 | 2/1966 | Rabo et al. | 208—111 |
| 3,287,252 | 11/1966 | Young | 208—59 |

ABRAHAM RIMENS, *Primary Examiner.*